(12) United States Patent
Chen et al.

(10) Patent No.: US 8,830,671 B2
(45) Date of Patent: Sep. 9, 2014

(54) MOUNTING APPARATUS FOR DATA STORAGE DEVICE

(75) Inventors: Yun-Lung Chen, New Taipei (TW); Chung Chai, New Taipei (TW); Da-Long Sun, Wuhan (CN); Zhi-Ming Guo, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 274 days.

(21) Appl. No.: 13/448,501

(22) Filed: Apr. 17, 2012

(65) Prior Publication Data

US 2013/0039014 A1 Feb. 14, 2013

(30) Foreign Application Priority Data

Aug. 10, 2011 (CN) .......................... 2011 1 0228094

(51) Int. Cl.
*G06F 1/16* (2006.01)
*G06F 1/18* (2006.01)
*G11B 33/12* (2006.01)

(52) U.S. Cl.
CPC ................ *G06F 1/187* (2013.01); *G06F 1/184* (2013.01); *G11B 33/128* (2013.01)
USPC .................................................... 361/679.33

(58) Field of Classification Search
CPC ....................................................... G06F 1/187
USPC ............................................ 361/726, 679.33
See application file for complete search history.

(56) References Cited

U.S. PATENT DOCUMENTS

| | | | | |
|---|---|---|---|---|
| 5,216,582 | A | * | 6/1993 | Russell et al. ........... 361/679.34 |
| 5,463,527 | A | * | 10/1995 | Hager et al. ............. 361/679.34 |
| 6,097,604 | A | * | 8/2000 | Hunter et al. ................. 361/727 |
| 6,798,652 | B2 | * | 9/2004 | Wang et al. ............. 361/679.33 |
| 6,982,870 | B2 | * | 1/2006 | Wu et al. .................. 361/679.33 |
| 7,428,147 | B2 | * | 9/2008 | Lin ........................... 361/679.33 |
| 8,355,256 | B2 | * | 1/2013 | Peng et al. ..................... 361/725 |
| 8,416,562 | B2 | * | 4/2013 | Ding ........................ 361/679.33 |
| 8,496,493 | B2 | * | 7/2013 | Lin et al. ....................... 439/345 |
| 2007/0171699 | A1 | * | 7/2007 | Chen et al. .................... 365/151 |
| 2010/0091444 | A1 | * | 4/2010 | Reid et al. ................ 361/679.37 |

* cited by examiner

*Primary Examiner* — Lisa Lea Edmonds
(74) *Attorney, Agent, or Firm* — Novak Druce Connolly Bove + Quigg LLP

(57) ABSTRACT

A mounting apparatus includes a bracket, a cage and a cushion. The bracket includes a mounting plate and two limiting plates located on the mounting plate. The cage is secured to the mounting plate and surrounds the two limiting plates. The cage includes a restricting piece. The two limiting plates are adapted to receive a data storage device. A plurality of cushions are interposed between the two limiting plates and the data storage device, in such manner that the data storage device is held captive in the cage but is protected from external jolts or physical shocks.

20 Claims, 7 Drawing Sheets

MOUNTING APPARATUS FOR DATA STORAGE DEVICE

BACKGROUND

1. Technical Field

The present disclosure relates to mounting apparatuses for data storage devices, and particularly to a mounting apparatus for a data storage device with a shock-proof assembly.

2. Description of Related Art

Data storage devices, such as hard disk drives and optical disk drives, are used in computers. The data storage devices may be fixedly attached within the computer or an electronic device. When the computer or the electronic device is dropped or jolted, an impact force may be directly transferred to the data storage device, thereby causing damage or a malfunction of the data storage device. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
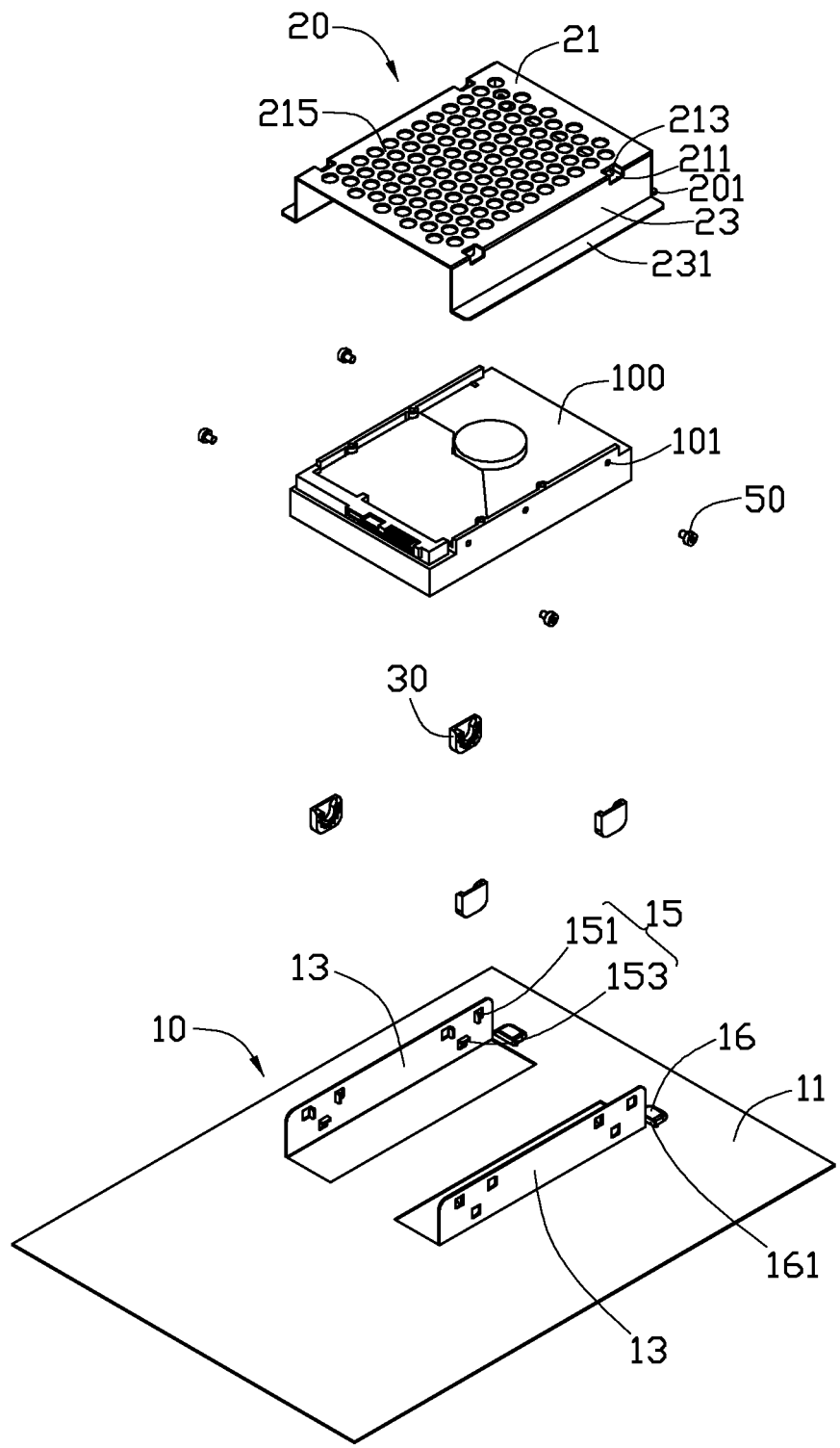
FIG. 1 is an exploded, isometric view of one embodiment of a mounting apparatus and a data storage device.

Referring to FIG. 1, a mounting apparatus, in accordance with an embodiment for securing a data storage device 100, includes a bracket 10, a cage 20 and a plurality of cushions 30.

Each of two opposite side surfaces of the data storage device 100 defines a plurality of securing holes 101. Each of the plurality of securing holes 101 can receive a locking member 50. In one embodiment, the locking member 50 is a cheese-headed or similar screw.

The bracket 10 includes a mounting plate 11 and two limiting plates 13. The two limiting plates 13 extend from the mounting plate 11. In one embodiment, the two limiting plates 13 are substantially parallel to each other and perpendicular to the mounting plate 11. The two limiting plates 13 may be, for example, integrated with the mounting plate 11. A limiting portion 15 protrudes from each end of each of the two limiting plates 13 towards each other. The limiting portion 15 includes two first limiting pieces 151 and a second limiting piece 153. The second limiting piece 153 is located between, but lower than, the two first limiting pieces 151. In one embodiment, the two first limiting pieces 151 are substantially parallel to each other and present a vertical aspect, and the second limiting piece 153 is substantially parallel to the mounting plate 11 and presents a horizontal aspect, being perpendicular to the two first limiting pieces 151. Two positioning portions 16 are located on the mounting plate 11. Each of the two positioning portions 16 is adjacent to an end of one of the two limiting plates 13. An aperture 161 is defined between each of the two positioning portions 16 and the mounting plate 11.

The cage 20 includes a top wall 21, two sidewalls 23, and a rear wall (not shown). In one embodiment, the two sidewalls 23 are substantially parallel to each other and perpendicularly connected to two opposite side edges of the top wall 21, and the rear wall is substantially perpendicular to the top wall 21 and the two sidewalls 23. The top wall 21 defines a plurality of air vents 215. Each of two opposite ends of the top wall 21 defines two cutouts 211. Each of the two cutouts 211 extends to each of the two sidewalls 23. A restricting piece 213 extends from an edge of each of the two cutouts 211 in the top wall 21. In one embodiment, the restricting piece 213 is substantially perpendicular to the top wall 21, each of the two cutouts 211 is substantially "L" shaped. A maintaining piece 231 extends outwards from a bottom edge of each of the two sidewalls 23. Two positioning pieces 201 extend from a bottom edge of the rear wall. In one embodiment, the maintaining piece 231 is substantially perpendicular to the two sidewalls 23, and the two positioning pieces 201 are substantially perpendicular to the rear wall. Each of the two positioning pieces 201 can be inserted into the aperture 161.

Figure 2:
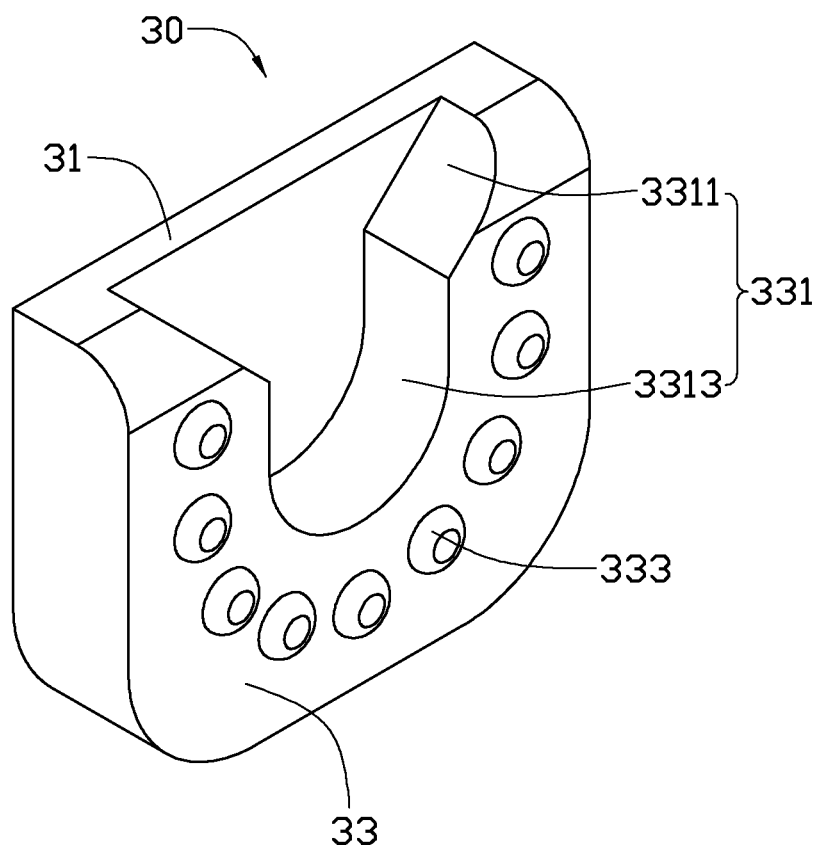
FIG. 2 is an isometric view of a shock-absorbing member of FIG. 1.
Figure 3:
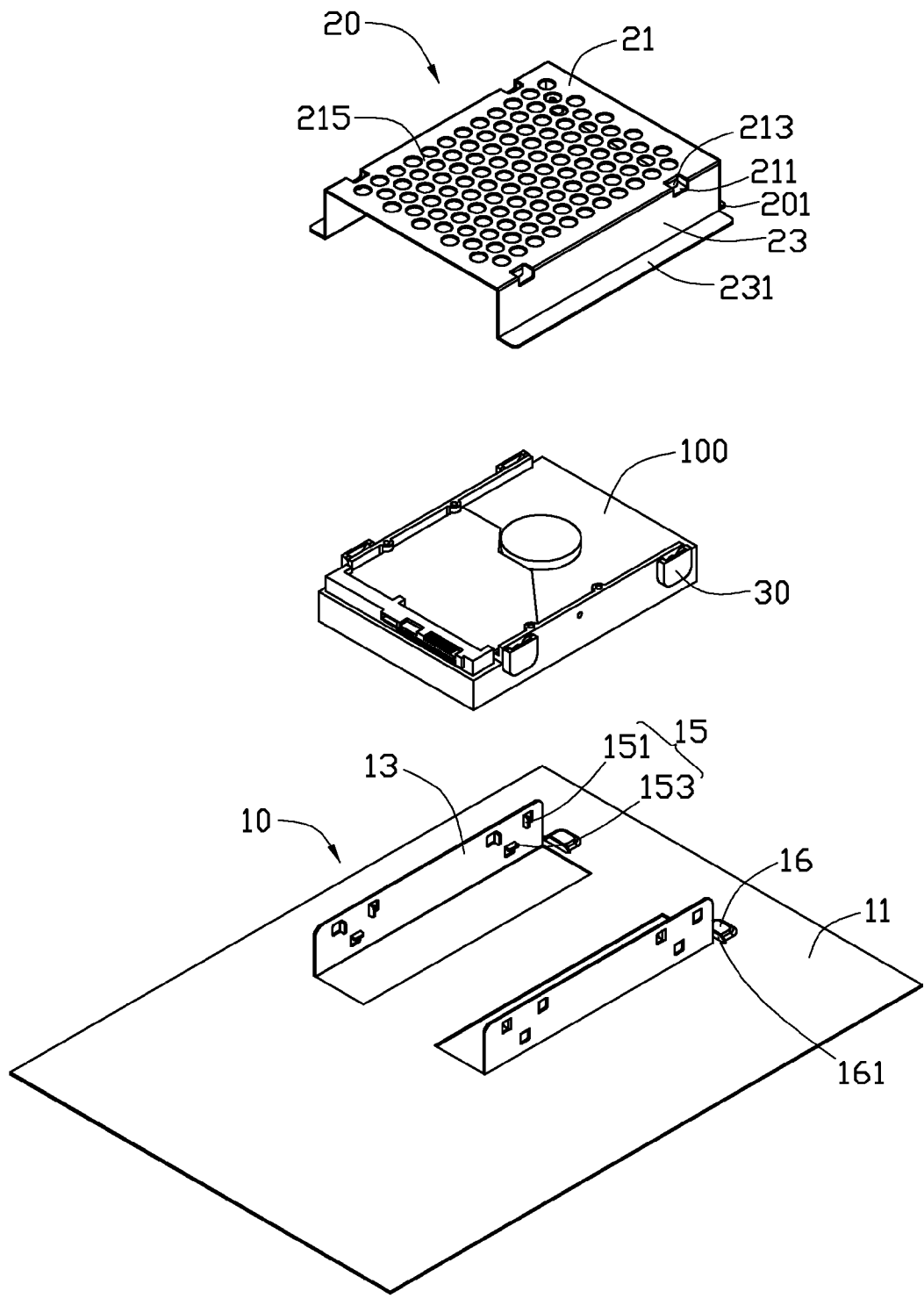
FIG. 3 is an isometric view of the mounting apparatus and the data storage device of FIG. 1 partially assembled.
Figure 4:
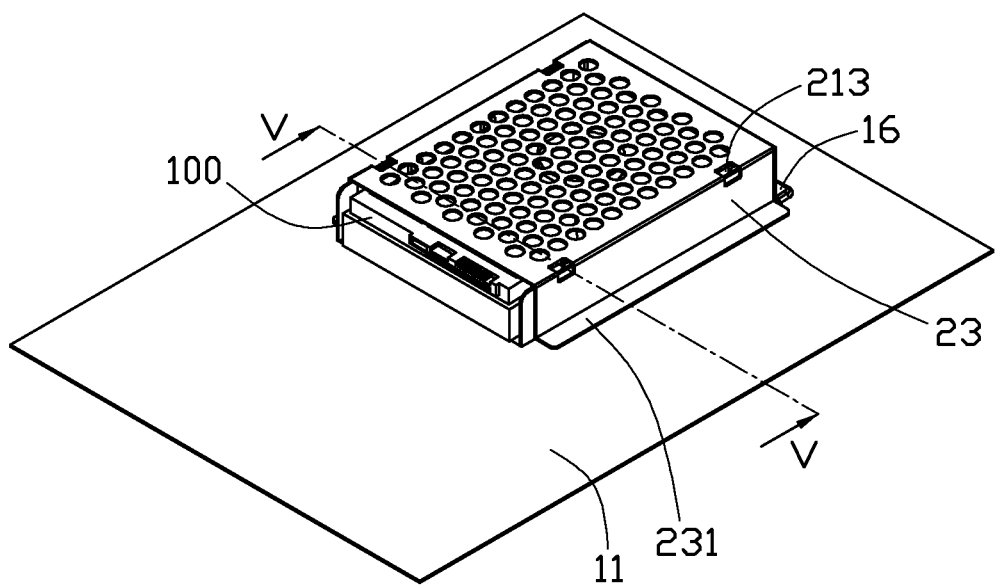
FIG. 4 is an assembled, isometric view of the mounting apparatus and the data storage device of FIG. 1.
Figure 5:
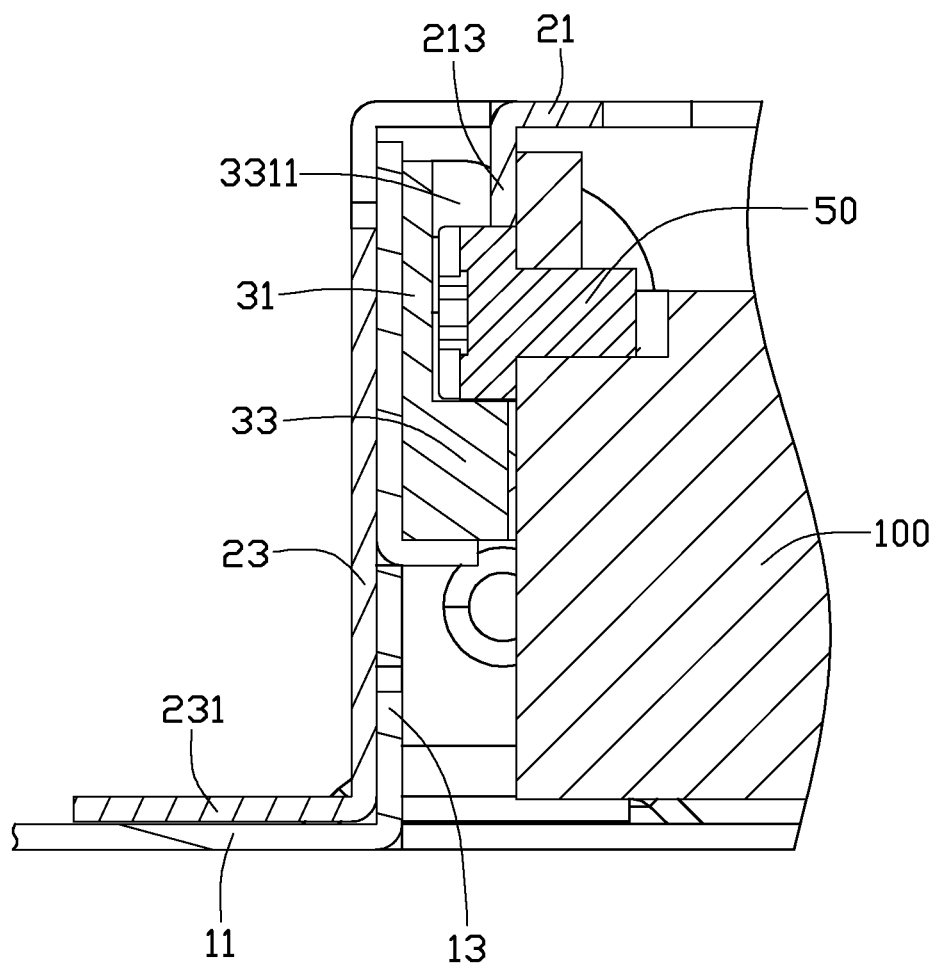
FIG. 5 is a cross-sectional view of FIG. 4, take along a line V-V.
Figure 6:
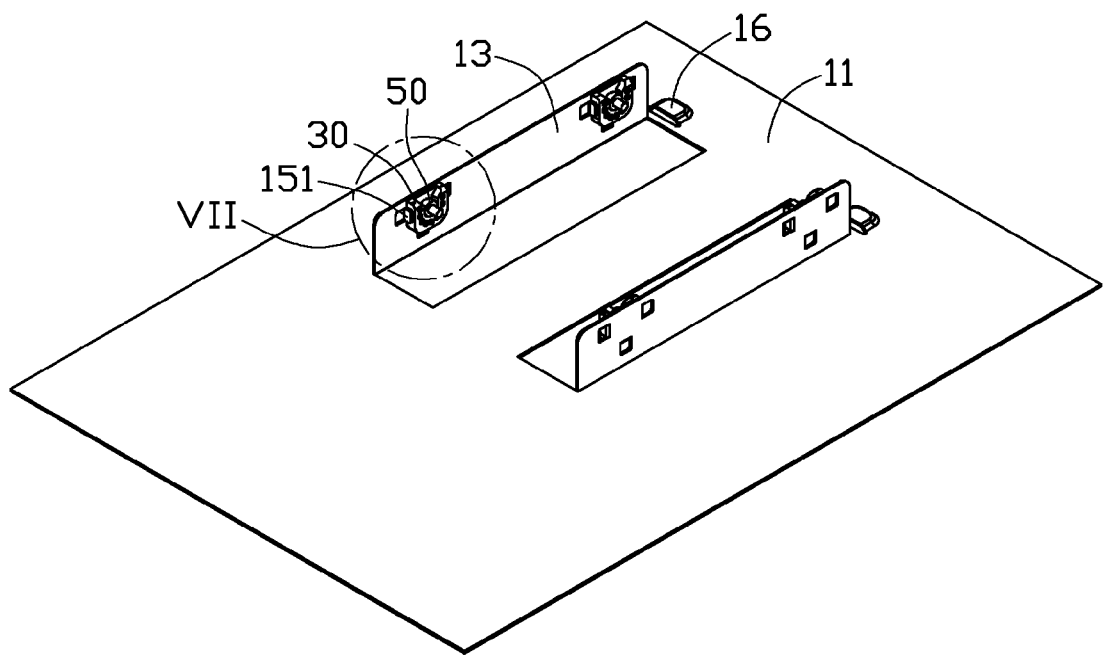
FIG. 6 is similar to FIG. 4, but the data storage device is not shown.
Figure 7:
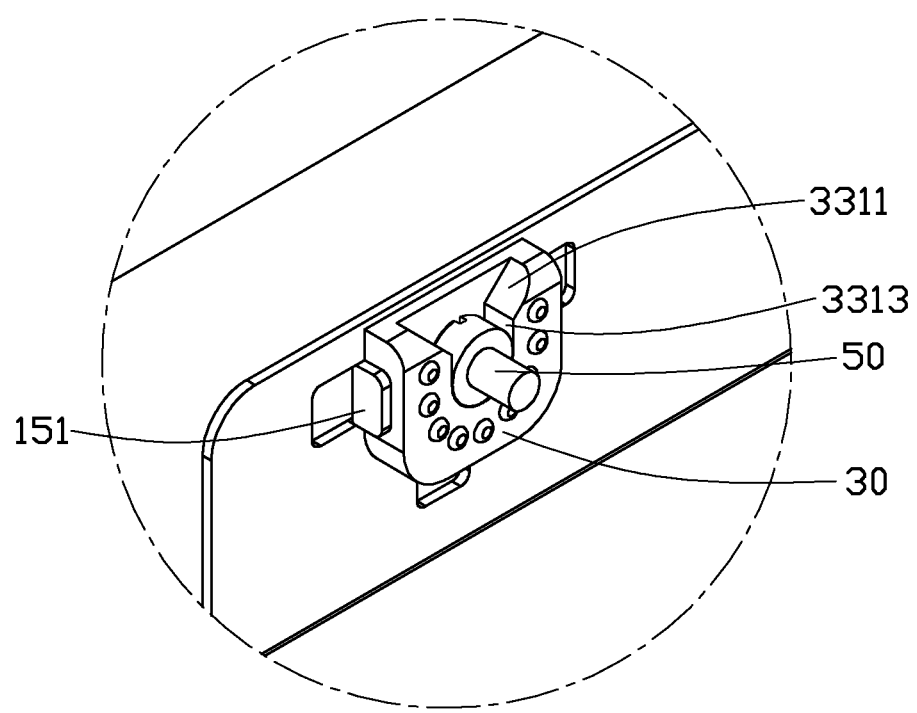
FIG. 7 is an enlarged view of a circled portion VII of FIG. 6.

Referring to FIG. 2, each of the plurality of cushions 30 includes a body 31, and a receiving portion 33 located on the body 31. The receiving portion 33 defines a receiving slot 331. The receiving slot 331 includes an inserting end 3311 and a latching end 3313. A width of the inserting end 3311 is larger than that of the latching end 3313. In one embodiment, the latching end 3313 is substantially "U" shaped. A plurality of protrusions 333 is located on an outer surface of the receiving portion 33. The plurality of protrusions 333 are arrayed to follow the "U" shape and are located around the latching end 3313.

Referring to FIGS. 3-7, in assembly, the locking member 50 is locked into each of the plurality of securing holes 101. Each of the plurality of cushions 30 is placed below each locking member 50, and the plurality of protrusions 333 abut the data storage device 100. Each of the plurality of cushions 30 is moved towards the locking member 50, to align the locking member 50 with the receiving slot 331, until the locking member 50 is inserted into the inserting end 3311 and abuts the latching end 3313. Each of the plurality of cushions 30 is moved upwards, to elastically deform the latching end 3313. The latching end 3313 exerts force to engage the locking member 50 with the latching end 3313. Thus, each of the plurality of cushions 30 is secured to the data storage device 100.

The data storage device 100 with the plurality of cushions 30 are placed between the two limiting plates 13, and each of the plurality of cushions 30 is aligned with the limiting portion 15. The data storage device 100 is moved towards the mounting plate 11. Each of the plurality of cushions 30 is moved between the two first limiting pieces 151 and is elastically deformed by the two first limiting pieces 151, until each of the plurality of cushions 30 is blocked by the second limiting piece 153. The two first limiting pieces 151 exert force to engage each of the plurality of cushions 30 therebetween. In this position, each of the plurality of cushions 30 is located between one of the two limiting plates 13 and the data storage device 100, and the body 31 abuts against one of the two limiting plates 13, and the plurality of protrusions 333 abut the side surface of the data storage device 100. Each of the plurality of cushions 30 is located between the top wall 21 and the second limiting piece 153.

The cage 20 is moved towards the bracket 10 and covers the two limiting plates 13. The cage 20 is slanted to insert each of the two positioning pieces 201 into the protrusion 16 through the aperture 161. The cage 20 is lowered flat, until the maintaining piece 231 abuts the mounting plate 11. In this position, the restricting piece 213 is inserted into the inserting end 3311 and abuts against the side surface of the data storage device 100. The restricting piece 213 abuts the locking member 50 in the latching end 3313 along a direction substantially perpendicular to mounting plate 11, to prevent the locking member 50 from lifting up from the receiving slot 331. Thus, the cage 20 is secured to the bracket 10, and the locking member 50 is engaged in the receiving slot 331.

In use, each of the plurality of cushions 30 is sandwiched between the data storage device 100 and one of the two limiting plates 13, to prevent the data storage device 100 being jolted along a direction substantially parallel to the mounting plate 11. The restricting piece 213 abuts the locking member 50 along the direction substantially perpendicular to mounting plate 11, to prevent the data storage device 100 from rising up in a direction substantially perpendicular to mounting plate 11.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the invention to the full extent indicated by the broad general meaning of the terms in which the appended claims are expressed.

What is claimed is:

1. A mounting apparatus for a data storage device, comprising:
   a bracket comprising a mounting plate, and two limiting plates located on the mounting plate, and the two limiting plates being configured to receive the data storage device therebetween;
   a cage secured to the mounting plate and surrounding the two limiting plates, the cage comprising a restricting piece; and
   a cushion secured to a limiting plate of the two limiting plates and defining a receiving slot;
   wherein the receiving slot is configured to receive a locking member secured to a side surface of the data storage device, and the cushion is located between the side surface of the data storage device and the limiting plate, so that the data storage device is prevented from moving along a first direction substantially parallel to the mounting plate; the restricting piece is received in the receiving slot and abuts the locking member along a second direction substantially perpendicular to the mounting plate.

2. The mounting apparatus of claim 1, wherein the receiving slot comprises an inserting end and a latching end, the latching end is adapted to engage with the locking member, and the restricting piece is received in the inserting end.

3. The mounting apparatus of claim 2, wherein a width of inserting end is larger than a width of the latching end, and the latching end is substantially "U" shaped.

4. The mounting apparatus of claim 2, wherein the cushion comprises a body and a receiving portion located on the body, and the receiving slot is defined in the receiving portion; a plurality of protrusions are located on an outer surface of the receiving portion; the body abuts the limiting plate, and the plurality of protrusions are configured to abut the data storage device.

5. The mounting apparatus of claim 4, wherein the plurality of protrusions are arrayed to follow a contour of the latching end and are arranged to surround the receiving slot.

6. The mounting apparatus of claim 1, wherein the cage comprises a top wall and two sidewalls substantially perpendicular to the top wall, the restricting piece extends from the top wall, and each of the two sidewalls abuts each of the two limiting plates and is substantially parallel to the restricting piece.

7. The mounting apparatus of claim 6, wherein a limiting portion extends from each of the two limiting plates; the limiting portion comprises two first limiting pieces and a second limiting piece, the second limiting piece is substantially perpendicular to the two first limiting pieces, and the cushion is secured between the two first limiting pieces and abuts the second limiting piece.

8. The mounting apparatus of claim 7, wherein the two first limiting pieces are substantially perpendicular to the mounting plate, and the second limiting piece is substantially parallel to the mounting plate.

9. The mounting apparatus of claim 7, wherein the top wall defines a plurality of air vents, and the cushion is located between the top wall and the second limiting piece.

10. The mounting apparatus of claim 6, wherein the cage further comprises a positioning piece substantially parallel to the top wall; a positioning portion protrudes from the mounting plate, and an aperture is defined between the positioning portion and the mounting plate; and the positioning piece is received in the positioning portion through the aperture.

11. A mounting apparatus for a data storage device, comprising:
    a bracket comprising a mounting plate, and two limiting plates located on the mounting plate, and the two limiting plates being configured to receive the data storage device therebetween;
    a cage secured to the mounting plate and surrounding the two limiting plates, and the cage comprising a top wall; and
    a cushion secured to a limiting plate of the two limiting plates and defining a receiving slot;
    wherein the receiving slot is configured to receive a locking member secured to a side surface of the data storage device, and the cushion is located between the side surface and the limiting plate, so that the data storage device is prevented from moving along a first direction substantially parallel to the mounting plate; the top wall and the mounting plate are substantially parallel to each other, the top wall and the mounting plate are configured to receive the data storage device therebetween, so that the data storage device is further prevented from moving along a second direction substantially perpendicular to the mounting plate.

12. The mounting apparatus of claim 11, wherein a restricting piece extends from the top wall, and the restricting piece is received in the receiving slot and abuts the locking member along the second direction substantially perpendicular to the mounting plate.

13. The mounting apparatus of claim 12, wherein the cage further comprises two sidewalls substantially perpendicular to the top wall, and each of the two sidewalls abuts each of the two limiting plates and is substantially parallel to the restricting piece.

14. The mounting apparatus of claim 11, wherein the receiving slot comprises an inserting end and a latching end, the latching end is adapted to engage with the locking member, and the restricting piece is received in the inserting end.

15. The mounting apparatus of claim 14, wherein a width of inserting end is larger than a width of the latching end, and the latching end is substantially "U" shaped.

16. The mounting apparatus of claim 14, wherein the cushion comprises a body and a receiving portion located on the body, and the receiving slot is defined in the receiving portion; a plurality of protrusions are located on an outer surface of the receiving portion; the body abuts the two limiting plate, and the plurality of protrusions are configured to abut the data storage device.

17. The mounting apparatus of claim 16, wherein the plurality of protrusions are arrayed to follow a contour of the latching end and are arranged to surround the receiving slot.

18. The mounting apparatus of claim 11, wherein a limiting portion extends from each of the two limiting plates; the limiting portion comprises two first limiting pieces and a second limiting piece, the second limiting piece is substantially perpendicular to the two first limiting pieces, and the cushion is secured between the two first limiting pieces and located between the top wall and the second limiting piece.

19. The mounting apparatus of claim 18, wherein the two first limiting pieces are substantially perpendicular to the mounting plate, and the second limiting piece is substantially parallel to the mounting plate.

20. The mounting apparatus of claim 11, wherein the cage further comprises a positioning piece substantially parallel to the top wall; a positioning portion protrudes from the mounting plate, and an aperture is defined between the positioning portion and the mounting plate; and the positioning piece is received in the positioning portion through the aperture.

* * * * *